United States Patent [19]

Boulton et al.

[11] Patent Number: 4,784,741
[45] Date of Patent: Nov. 15, 1988

[54] ELECTROLYTIC CELL AND GASKET

[75] Inventors: Thomas W. Boulton; Brian J. Darwent, both of Frodsham, England

[73] Assignee: Imperial Chemical Industries PLC, London, England

[21] Appl. No.: 95,920

[22] Filed: Sep. 14, 1987

[30] Foreign Application Priority Data

Sep. 22, 1986 [GB] United Kingdom ................. 8622749

[51] Int. Cl.⁴ ...................... C25B 13/02; C25B 13/04
[52] U.S. Cl. .................................. 204/242; 204/252; 204/279; 204/253; 204/289
[58] Field of Search ....................... 204/279, 253–258, 204/289, 242, 263–266

[56] References Cited

U.S. PATENT DOCUMENTS 3,960,698  6/1976  Bortak ................................ 204/267
4,493,759  1/1985  Boulton et al. ..................... 204/279
4,654,134  3/1987  Morris et al. ................... 204/279 X Primary Examiner—Donald R. Valentine
Attorney, Agent, or Firm—Cushman, Darby & Cushman

[57] ABSTRACT

A gasket of an electrically insulating material, suitable for use in an electrolytic cell, which gasket comprises a plurality of projections and/or recesses on and/or in a surface thereof which are adapted to cooperate with corresponding recesses and/or projections in and/or on a surface of an anode or of a cathode or of a gasket adjacent thereto, in which the projections and/or recesses are present as a plurality of rows thereof on and/or in a surface of the gasket. Also, an electrolytic cell, which may be of the filter press type, and which contains a gasket as described.

15 Claims, 6 Drawing Sheets

ELECTROLYTIC CELL AND GASKET

This invention relates to an electrolytic cell and to a gasket for use in an electrolytic cell.

Electrolytic cells are known comprising a plurality of anodes and cathodes with each anode being separated from the adjacent cathode by a separator which divides the electrolytic cell into a plurality of anode and cathode compartments. The anode compartments of such a cell are provided with means for feeding electrolyte to the cell, suitably from a common header, and with means for removing products of electrolysis from the cell. Similarly, the cathode compartments of the cell are provided with means for removing products of electrolysis from the cell, and optionally with means for feeding water or other fluid to the cell.

The separator in the electrolytic cell may be a hydraulically permeable diaphragm which permits electrolyte to flow from the anode compartments to the cathode compartment of the cell, or it may be a substantially hydraulically impermeable membrane which is ionically permselective, for example, cation permselective, and which permits selective flow of ionic species between the anode compartments and the cathode compartments of the cell.

Such electrolytic cells may be used in the electrolysis of a wide variety of electrolytes, and they are widely used in the electrolysis of aqueous alkali metal chloride solution. Where such a solution is electrolysed in an electrolytic cell of the diaphram type the solution is fed to the anode compartments of the cell, chlorine which is produced in the electrolysis is removed from the anode compartments of the cell, the alkali metal chloride solution passes through the diaphragms and hydrogen and alkali metal hydroxide produced by electrolysis are removed from the cathode compartments, the alkali metal hydroxide being removed in the form of an aqueous solution of alkali metal chloride and alkali metal hydroxide. Where an aqueous alkali metal chloride solution is electrolysed in an electrolytic cell of the membrane type containing a cation permselective membrane the solution is fed to the anode compartments of the cell and chlorine produced in the electrolysis and depleted alkali metal chloride solution are removed from the anode compartments, alkali metal ions are transported across the membranes to the cathode compartments of the cell to which water or dilute alkali metal hydroxide solution may be fed, and hydrogen and alkali metal hydroxide solution produced by the reaction of alkali metal ions with hydroxyl ions are removed from the cathode compartments of the cell.

Electrolytic cells of the type described may be used particularly in the production of chlorine and sodium hydroxide by the electrolysis of aqueous sodium chloride solution.

Electrolytic cells of the type described may have a variety of different forms. Thus, the electrolytic cell may be of the tank type and comprise a cathode box having side walls and a plurality of cathode fingers or pockets generally parallel to each other, and within the box a plurality of anodes evenly spaced from each other and also generally parallel to each other and fixed to a base, the anodes being positioned between adjacent cathode fingers or in the cathode pockets of the cathode box. The invention of the present application is, however, particularly suitable for use with an electrolytic cell of the filter press type which comprises a large number of alternating anodes and cathodes, for example, fifty anodes alternating with fifty cathodes, although the cell may comprise even more anodes and cathodes, for example up to one hundred and fifty alternating anodes and cathodes.

Electrolytic cells of the filter press type may comprise a plurality of gaskets of an electrically insulating material, for example, of an elastomeric electrically insulating material. In such an electrolytic cell one or more gaskets may be positioned between and in contact with each anode and adjacent cathode and may serve to electrically insulate the anodes and cathodes from each other and also serve to provide spaces in the electrolytic cell to form the anode and cathode compartments. Alternatively, the anodes and cathodes may be positioned within frame-like gaskets, for example in recesses in the gaskets, and in the electrolytic cell there may be other gaskets which provide spaces in the cell to form the anode and cathode compartments.

In such electrolytic cells, and particularly in electrolytic cells of the filter press type comprising a large number of gaskets, difficulty may be experienced during the assembly of the cell in accurately positioning a gasket in relation to an adjacent gasket or to an adjacent anode and/or cathode. Difficulty may also be experienced in maintaining a gasket in position in relation to an adjacent gasket or to an adjacent anode and/or cathode when the pack comprising the component parts of the cell is compressed during assembly. When compressed there is a tendency for one or more of the gaskets to be displaced and even to be squeezed out of the pack. Furthermore, during use the cell gaskets may tend to be displaced with consequent danger of leakage of electrolyte from the cell.

In European Patent Publication No. 0 094 772 there is described a gasket for use in an electrolytic cell which is so constructed as to facilitate accurate positioning of the gasket in relation to an adjacent gasket or to an adjacent anode and/or cathode in the electrolytic cell, and to facilitate maintenance of the position of the gasket in relation to an adjacent gasket or to an adjacent anode and/or cathode during assembly and during use of the electrolytic cell. The gasket described in the aforementioned European Patent Publication comprises a plurality of projections and/or recesses on and/or in a surface thereof which are adapted to cooperate with corresponding recesses and/or projections in or on a surface of an anode or of a cathode or of a gasket adjacent thereto.

In the gasket the projections and/or recesses are positioned on and in a frame-like part of the gasket and the projections and/or recesses are positioned in the form of a single row of such projections and/or recesses around the frame-like part of the gasket. The projections and/or recesses are preferably spaced apart by a distance in the range 1 to 20 cm, although they may be positioned closer together or spaced further apart.

The closer together are the projections and/or recesses on and/or in the surface of the gasket the greater is the number of positions per unit length of the gasket at which the gasket is fixed to an adjacent gasket or to an adjacent anode and/or cathode, and the greater will be the possibility of the gasket being maintained in position in the electrolytic cell during assembly of the cell and during use of the cell.

However, positioning of the projections and/or recesses close together on and in the surface of the gasket leads to difficulties. Thus, if the gasket comprises a large number of closely spaced recesses, for example holes, in the surface thereof the gasket may become structurally weakened. Also, and particularly in the case of a monopolar electrolytic cell in which electrical power is charged to or removed from each electrode through an edge of the electrode and in which electrical current flows in the plane of the electrode, the provision of a large number of closely spaced recesses in the electrode may provide a significant resistance to flow of electrical current through the electrode and also may provide a source of structural weakness in the electrode, particularly where the recesses are in the form of holes.

The present invention overcomes the aforementioned difficulties. In particular it provides a gasket which comprises a plurality of projections and/or recesses on and/or in a surface thereof which are spaced apart, which gasket may be fixed as firmly to an adjacent gasket or to an adjacent anode and/or cathode as may a gasket as described in the aforementioned European Patent Publication, yet in which the projections and/or recesses may be spaced apart by a substantially greater distance than the projections and/or recesses on and/or in the surface of the gasket of the aforementioned European Patent Publication.

According to the present invention there is provided a gasket of an electrically insulating material suitable for use in an electrolytic cell, which gasket comprises a plurality of projections and/or recesses on and/or in a surface thereof which are adapted to cooperate with corresponding recesses and/or projections in and/or on a surface of an anode or of a cathode or of a gasket adjacent thereto, in which the projections and/or recesses are present as a plurality of rows thereof on and/or in a surface of the gasket.

The invention is not limited to application to electrolytic cells of the filter press type. However, it is particularly suitable for application to such cells comprising a plurality of alternating anodes and cathodes and a plurality of gaskets as it is in such filter press cells that the difficulties of accurately positioning the gaskets and the danger of displacement of gaskets during assembly and use of the cell is most marked.

In the gasket of the present invention comprising a plurality of rows of projections and/or recesses on and/or in a surface thereof the projections and/or recesses in a given row may be much more widely spaced than may be the projections and/or recesses in a gasket comprising a single row of such projections and/or recesses yet the former gasket may be as securely fixed in position in the electrolytic cell as the latter gasket, and the former gasket may be as readily maintained in position in the cell as the latter gasket during assembly and use of the cell. Alternatively, in the gasket of the present invention comprising a plurality of rows of projections and/or recesses on and/or in a surface thereof the projections and/or recesses in a given row may as widely spaced as the projections and/or recesses in a gasket comprising a single row of such projections and/or recesses. In this case the former gasket may be much more securely fixed in position in the electrolytic cell than the latter gasket, and the former gasket may be much more securely maintained in position in the cell than the latter gasket during assembly and use of the cell. As it is unnecessary to have a small spacing between adjacent projections and/or recesses in a given row of such projections and/or recesses in the gasket of the invention the recesses are not such as a great source of structural weakness in the gasket, particularly when the recesses are in the form of holes. Furthermore, in the anode or cathode in the electrolytic cell it is unnecessary to have a small spacing between adjacent projections and/or recesses and thus the recesses are not as great a source of structural weakness nor do they provide such a resistance to flow of electrical current, particularly when the recesses are in the form of holes.

The gasket of the invention will generally be substantially planar, and it may have a frame-like form which defines an opening. In the electrolytic cell the opening may provide a space for the anode or cathode compartment, or the anode or cathode may be positioned in the opening. The electrolytic cell may be a monopolar or a bipolar electrolytic cell.

In the electrolytic cell a gasket may be positioned adjacent to an anode and/or a cathode in which case the projections and/or recesses on and/or in a surface of the gasket cooperate with corresonding recesses and/or projections in and/or on a surface of the anode and cathode. The gasket may be positioned between an anode and adjacent cathode or between an anode of a bipolar electrode and a cathode of an adjacent bipolar electrode.

Where the anode or cathode is positioned in an opening in a gasket the projections and/or recesses on and/or in a surface of the gasket cooperate with corresponding recesses and/or projections in and/or on a surface of another gasket adjacent thereto.

The projections and/or recesses are suitably positioned on and/or in a frame-like part of the gasket, and the projections and/or recesses may be positioned on and/or in one surface of the gasket or both, that is opposite, surfaces of the gasket.

The gasket comprises a plurality of rows of projections and/or recesses, and the gasket may comprise two such rows or three or more such rows. For simplicity it is preferred that the gasket comprises two such rows of projections and/or recesses. The projections and/or recesses in one such row may be positioned substantially in line with the projections and/or recesses in the row or rows of such projections and/or recesses adjacent thereto, or alternatively the projections and/or recesses in one row may be staggered in relation to the projections and/or recesses in a row or rows of projections and/or recesses adjacent thereto, that is the projections and/or recesses in one row may be positioned opposite to a space between adjacent projections and/or recesses in a row or rows of projections and/or recesses adjacent thereto.

The gasket may comprise projections in one row and recesses in a row or rows adjacent thereto or each of the rows may comprise both projections and recesses. Indeed, in a given row the projections and recesses may be positioned alternately.

The gasket may comprise any suitable shape of projection on a surface thereof, and the recesses will have a shape desined to cooperate with the projections. For example, the projections may be in the form of studs on a surface of the gasket. The studs may be rectangular in shape, e.g. square or oblong shaped, or they may be cylindrical in shape. The recesses will be shaped so as to cooperate with the shape of the projections, and the recesses may be provided by correspondingly shaped holes in the gasket which pass from one surface of the gasket to the other.

The projections should stand proud from the surface of the gasket by an amount sufficient to achieve the desired result of accurate positioning of the gasket during assembly of the electrolytic cell and should ensure that the gasket remains in its predetermined position in the cell during use of the cell. Thus, it is preferred that the projection forms a relatively tight fit in the recess with which it cooperates.

The projections on the surface of the anode or cathode, if present, may be in the form of suitably shaped studs welded or brazed to the surface of the anode or cathode and shaped to cooperate with recesses on the surface of the gasket adjacent thereto. The projections and recesses on and in the surface of the anode or cathode may be produced by forming a slit or slits in the surface of the anode or cathode and displacing a part of the anode or cathode into the form of an upstanding projection. This method of forming a projection on the surface of the anode or cathode also results in production of a recess in the surface of the anode or cathode.

In a particular embodiment of the electrolytic cell each anode and each cathode, other than the terminal anode and cathode, are positioned between a pair of gaskets, the gaskets comprise a plurality of projections and/or recesses in a plurality of rows on and/or in at least a surface of the gaskets facing the anode or cathode, the anode or cathode comprises recesses in a plurality of rows in the surfaces thereof, and the projections on the surface of one or both of the gaskets pass through the recesses in the anode or cathode and cooperate with corresponding recesses in the surface of the gasket on the opposite side of the anode or cathode.

The projections and/or recesses on and/or in the surface of the gasket should be so distributed as to provide the desired result of accurate positioning of the gasket during assembly of the electrolytic cell and should ensure that the gasket remains in its predetermined position in the cell during use of the cell.

In general the projections and/or recesses in a given row thereof will be spaced apart by not more than 20 cm and they may even be spaced apart by as little as 4 cm. However, these spacing are intended to serve as a general guide and they are not intended to be limiting.

The spacing between one row of projections and/or recesses on and/or in the surface of the gasket and an adjacent row of projections and/or recesses may be as little as 0.5 cm. It will in general, however, be at least 1 cm. The maximum spacing between adjacent such rows will depend on the dimensions of the gasket, and in particular on the dimensions of the frame-like part of the gasket. The spacing between such adjacent rows will in general be not more than 2 cm.

The thickness of the gasket will determine, at least in part, the dimensions of the anode or cathode compartment of the electrolytic cell. The gasket may for example have a thickness in the range 0.1 to 2 cm.

The gaskets should be made of an electrically insulating material. It is desirable that the gaskets are flexible, and preferably resilient, in order to aid in achieving leak-tight seals in the electrolytic cell.

The gaskets are suitably made of an oranic polymeric material which material may be, for example, a polyolefin, e.g. polyethylene or polypropylene; a hydrocarbon elastomer, e.g. an elastomer based on ethylene-propylene copolymer, an ethylene-propylenediene copolymer, natural rubber or a styrene-butadiene rubber; or a chlorinated hydrocarbon, e.g. polyvinyl chloride or polyvinylidene chloride. It is particularly desirable that the material of the gasket be chemically resistant to the liquors in the electrolytic cell, and when the cell is to be used in the electrolysis of aqueous alkali metal chloride solution the material may be a fluorinated polymeric material, for example polytetrafluoroethylene, polyvinyl fluoride, polyvinylidene fluoride, fluorinated ethylene-propylene copolymer, tetra-fluoro-ethylene-hexafluoro-propylene copolymer, or a substrate having an outer layer of such a fluorinated polymeric material.

Where the electrolytic cell contains a separator the separator may be of the diaphragm or membrane type.

In the diaphragm type cell the separators positioned between adjacent anodes and cathodes to form separate anode compartments and cathode compartments are microporous and in use the electrolyte passes through the diaphragms from the anode compartments to the cathode compartments. Thus, in the case where aqueous alkali metal chloride solution is electrolysed the cell liquor which is produced comprises an aqueous solution of alkali metal chloride and alkali metal hydroxide. In the membrane type electrolytic cell the separators are essentially hydraulically impermeable and in use ionic species, or hydrated ionic species, are transported across the membranes between the compartments of the cell. Thus, where the membrane is a cation-exchange membrane cations are transported across the membrane, and in the case where aqueous alkali metal chloride solution is electrolysed the cell liquor comprises an aqueous solution of alkali metal hydroxide.

Where the separator to be used in electrolytic cell is a microporous diaphragm the nature of the diaphragm will depend on the nature of the electrolyte which is to be electrolysed in the cell. The diaphragm should be resistant to degradation by the electrolyte and by the products of electrolysis and, where an aqueous solution of alkali metal chloride is to be electrolysed, the diaphragm is suitably made of a fluorine-containing polymeric material as such materials are generally resistant to degradation by the chlorine and alkali metal hydroxide produced in the electrolysis. Preferably, the microporous diaphragm is made of polytetrafluoroethylene, although other materials which may be used include, for example, tetrafluoro-ethylene—propylene copolymers.

Suitable microporous diaphragms are those described, for example, in UK Patent No. 1503915 in which there is described a microporous diaphragm of polytetrafluoroethylene having a microstructure of nodes interconnected by fibrils, and in UK Patent No. 1081046 in which there is described a microporous diaghragm produced by extracting a particulate filler from a sheet of polytetrafluoroethylene. Other suitable microporous diaphragms are described in the art.

Where the separator to be used in the cell is a cation-exchange membrane the nature of the membrane will also depend on the nature of the electrolyte which is to be electrolysed in the cell. The membrane should be resistant to degradation by the electrolyte and by the products of electrolysis and, where an aqueous solution of alkali metal chloride is to be electrolysed, the membrane is suitably made of a fluorine-containing polymeric material containing cation-exchange groups, for example, sulphonic acid, carboxylic acid or phosphonic acid groups, or derivatives thereof, or a mixture of two or more such groups.

Suitable cation-exchange membranes are those described, for example, the UK Patent Nos. 1184321, 1402920, 14066673, 1455070, 1497748, 1497749, 1518387, and 1531068.

The separators may be secured in position in the electrolytic cell, for example, by fixing the separator to a gasket, or by clamping a separator between the surfaces of a pair of adjacent gaskets with a separator being positioned between each anode and adjacent cathode. The separator may for example be provided with a plurality of holes in the surface thereof through which the projections on the surface of a gasket adjacent thereto may be positioned. Such holes in the surface of the separator assist in correct positioning of the separator in the electrolytic cell.

Some electrolysis processes are operated in an electrolytic cell which does not contain a separator. For example, aqueous alkali metal chlorate solution may be produced by electrolysis of aqueous alkali metal chloride solution in an electrolytic cell which does not contain a separator.

The electrode in the electrolytic cell will generally be made of a metal or alloy and the nature of the metal or alloy will depend on whether the electrode is to be used as an anode or cathode and on the nature of the electrolyte which is to be electrolysed in the electrolytic cell.

Where aqueous alkali metal chloride solution is to be electrolysed and the electrode is to be used as an anode the electrode is suitably made of a filmforming metal or an alloy thereof, for example of zirconium, niobium, tungsten or tantalum, but preferably of titanium, and the surface of the anode suitably carries a coating of an electro-conducting electrocatalytically active material. The coating may comprise one or more platinum group metals, that is platinum, rhodium, iridium, ruthenium, osmium or palladium, and/or an oxide of one or more of these metals. The coating of platinum group metal and/or oxide may be present in admixture with one or more nonnoble metal oxides, e.g. titanium dioxide. Electroconducting electrocatalytically active materials for use as anode coatings in an electrolytic cell for the electrolysis of aqueous alkali metal chloride solution, and the methods of application of such coatings, are well known in the art.

Where aqueous alkali metal chloride solution is to be electrolysed and the electrode is to be used as a cathode the electrode is suitably made of iron or steel, or of other suitable metal, for example, nickel. The cathode, may be coated with a material designed to reduce the hydroen overpotential of the electrolysis.

The electrode may at least in part have a foraminate surface, for example, it may be a perforated plate, or it may have a mesh surface or surfaces, e.g. a woven mesh, or it may comprise a plurality of spaced apart elongated members, e.g. a plurality of strips which will generally be parallel to each other and vertically disposed in the electrolytic cell.

The electrolytic cell may be a monopolar cell or a bipolar cell, that is the cell may comprise individual anodes and cathodes separated from each other or the anodes and cathodes may be associated with each other in the form of bipolar electrodes.

In the electrolytic cell the anode compartments will be provided with means for feeding electrolyte to the compartments, suitably from a common header, and, in the case where the cell is fitted with ion-exchange membranes, with means for removing products of electrolysis from the compartments. Similarly, the cathode compartments of the cell will be provided with means for removing products of electrolysis from the compartments, and optionally with means for feeding water or other fluid to the compartments, suitably from a common header.

For example, where the cell is fitted with ion-exchange membranes and is to be used in the electrolysis of aqueous alkali metal chloride solution the anode compartments of the cell will be provided with means for feeding the aqueous alkali metal chloride solution to the anode compartments and with means for removing depleted aqueous alkali metal chloride solution from the anode compartments, and the cathode compartments of the cell will be provided with means for removing hydrogen and cell liquor containing alkali metal hydroxide from the cathode compartments, and optionally, and if necessary, with means for feeding water or dilute alkali metal hydroxide solution to the cathode compartments.

Although it is possible for the means for feeding electrolyte and for removing products of electrolysis to be provided by separate pipes leading to or from each of the respective anode and cathode compartments in the cell such an arrangement may be unnecessarily complicated and cumbersome, particularly in an electrolytic cell of the filter press type which may comprise a large number of such compartments. In a preferred type of electrolytic cell the gaskets, and optionally the anode and cathodes, have a plurality of opening therein which in the cell define separate compartments lengthwise of the cell and through which the electrolyte may be fed to the cell, e.g. to the anode compartments of the cell, and the products of electrolysis may be removed from the cell, e.g. from the anode and cathode compartments of the cell. The compartments lengthwise of the cell may communicate with the anode compartments and cathode compartments of the cell via channels in the gaskets, e.g. in the walls of the gaskets. The openings in the gasket may be provided in the frame-like part of the gasket.

The invention will now be described with reference to the following drawings.

The parts of the metal electrodes and the associated pair of gaskets whch are shown in detail in FIGS. 4 to 9 are all that are required to be shown in order to illustrate the inventive feature of the gasket of the invention.

Figure 1:
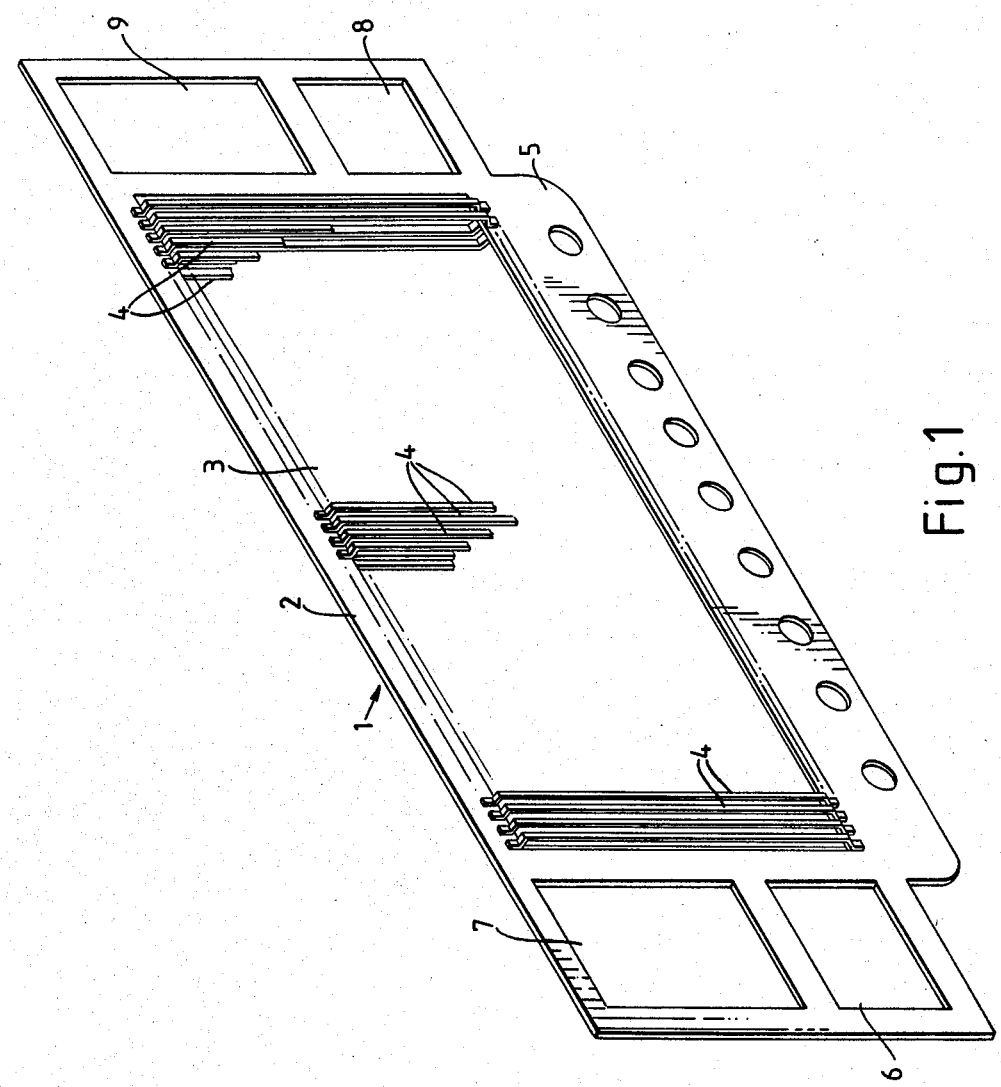
FIG. 1 is an isometric view of an electrode for use in an electrolytic cell from which, for simplicity, projections and recesses have been omitted.

Referring to FIG. 1 the metallic electrode (1) comprises a frame-like member (2) which defines a central opening (3). The central opening (3) is bridged by a plurality of vertically disposed strips (4) which are attached to the upper and lower parts of the frame-like member and are parallel to and displaced from the plane of the frame-like member. The strips (4) are positioned on both sides of the frame-like member (2) and serve as the active part of the metallic electrode (1). The strips (4) may have a coating of an electrocatalytically-active material, and they are so positioned that a strip on one side of the frame member (2) is positioned opposite the gap between two adjacent strips on the other side of the frame member (2).

The metallic electrode (1) has a projection (5) onto which a suitable electrical connection may be fixed. Where the electrode (1) is to be used as an anode the projection (5) is positioned on the lower edge of the frame-like member (2) and where the electrode (1) is to be used as a cathode the projection (5) is positioned on the opposite upper edge of the frame-like member (2). The frame-like memer (2) comprises a pair of openings (6,7) positioned to one side of the central opening (3) and a pair of openings (8,9) positioned to the opposite side of the central opening (3). When the electrode is installed in an electrolytic cell these openings form a part of compartments lengthwise of the cell through which electrolyte and other fluid may be charged to the anode and cathode compartments of the cell and through which the products of electrolysis may be removed from the anode and cathode compartments of the cell. The metal of the electrode will be chosen depending on whether it is to be used as an anode or a cathode and on the nature of the electrolyte to be used in the electrolytic cell.

Figure 2:
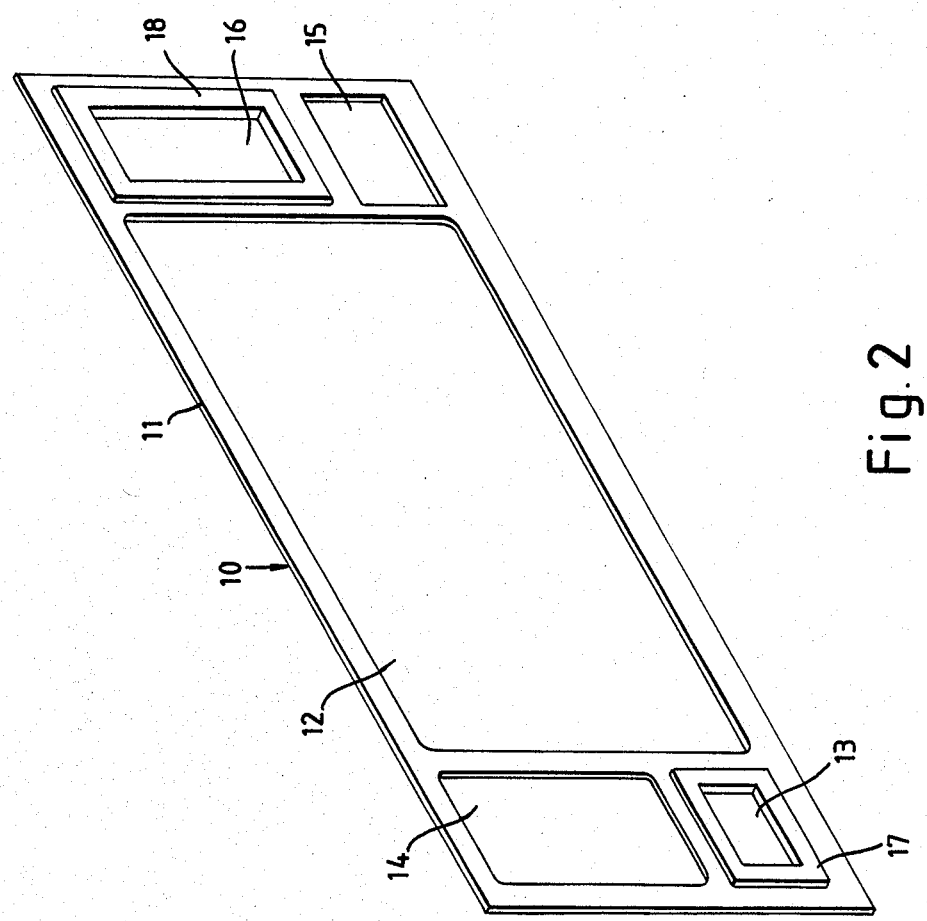
FIG. 2 is an isometric view of a frame-like gasket for use in an electrolytic cell from which, for simplicity, projections and recesses have been omitted.

Referring to FIG. 2 the gasket (10) comprises a frame-like part (11) which defines a central opening (12). The frame-like part (11) comprises a pair of openings (13,14) positioned to one side of the central opening (12) and a pair of openings (15,16) positioned to the opposite side of the central opening (12). When the gasket is installed in an electrolytic cell these openings form a part of compartments lengthwise of the cell through which electrolyte and other fluid may be charged to the anode and cathode compartments of the cell and through which the products of electrolysis may be removed from the anode and cathode compartments of the cell. The openings (13,16) also have upstanding frame-like members (17,18) positioned around the openings and projecting from the plane of the frame-like gasket and which are adapted to fit into the openings (6,9) respectively of the metallic electrode when assembled into the electrolytic cell. The upstanding frame-like members (17,18) provide the required electrical insulation in the electrolytic cell between the compartments lengthwise of the cell formed in part by openings (6,7,8,9) in the electrode. The upstanding frame-like members (17,18) are of unitary construction with the gasket (10) and may be produced, for example, by moulding a suitable electrically insulating thermoplastic polymeric material. Where the electrolytic cell comprises gaskets of the type illustrated in FIG. 2 it will also comprise similar gaskets in which the upstanding frame-like members (17,18) are positioned around the openings (15,14) respectively of the gasket, or each gasket may comprise upstanding frame-like members positioned around each of the openings (13,14,15,16).

Figure 3:
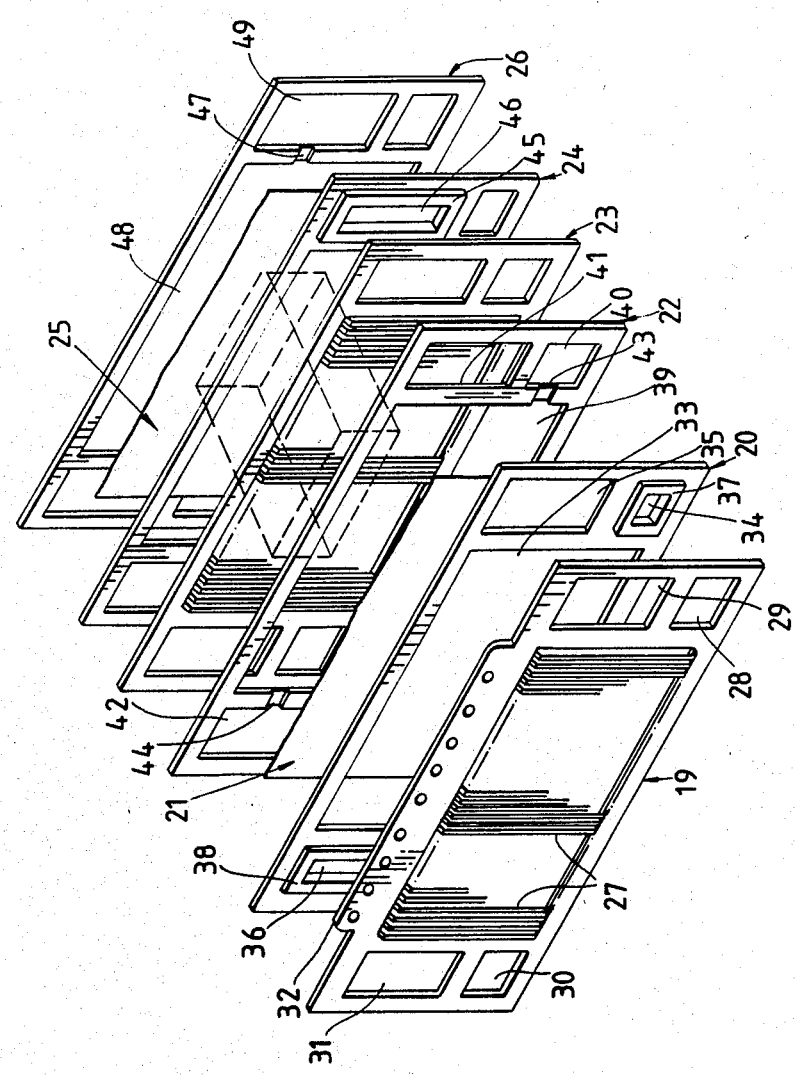
FIG. 3 is an isometric exploded view of a part of an electrolytic cell from which, for simplicity, projections and recesses have been omitted.

The embodiment of FIG. 3 shows a part of an electrolytic cell of the invention and comprises a cathode (19) a gasket (20), a cation-exchange membrane (21), a gasket (22), an anode (23) a gasket (24), a cation-exchange membrane (25) and a gasket (26). The cathode (19) comprises a plurality of vertically disposed strips (27) positioned on both sides of the cathode and four openings (28,29,30,31), and a projection (32) suitable for electrical connection. The gasket (20) comprises a central opening (33) and four openings (34,35,36 one not shown and two upstanding frame-like members (37,38) projecting from the plane of the surface of the gasket. The gasket (22) is a plane gasket and comprises a central opening (39), four openings (40,41,42, one not shown), and also two channels (43,44) in the walls of the gasket which provide communicating channels between the central opening (39) and the openins (40,42) respectively). The anode (23) is of similar construction to the cathode (19) except that the projection for electrical connection is positioned on the lower edge of the anode and is not shown. The gasket (24) is of similar construction to the gasket (20) except that the upstanding frame-like members (45, one not shown) projecting from the plane of the surface of the gasket are positioned around openings (46, one not shown) in the gasket (24) different in position from those in the gasket (20) around which frame-like members are positioned. The gasket (26) is of similar construction to gasket (22) except that in gasket (26) the channels (47, one not shown) in the walls of the gasket provide communicating channels between the central opening (48) and openings in the gasket (49, one not shown) different in position from those in the gasket (22) which are in communication with the central opening (39) in the gasket (22).

In the electrolytic cell the gaskets (22 and 24) and the anode (23) together form an anode compartment of the cell, the compartment being bounded by the cation-exchange membranes (21,25). Similarly, the cathode compartments of the cell are formed by the cathode (19), gasket (20), and a gasket (not shown) of the type of (26) positioned adjacent to the cathode (19), the cathode compartment also being bounded by two cation-exchange membranes. In the assembled cell the cation-exchange membranes are held in position by gaskets positioned on either side of each membrane. For the sake of clarity the embodiment of FIG. 3 does not shown end plates for the cell which of course form a part of the cell, nor the means attached to the end plates, e.g. bolts, and tie rods, which are provided in order to fasten together the electrodes and gaskets in a leak tight assembly. The cell comprises a plurality of anodes and cathodes as hereinbefore described. The cell also comprises vessels from which electrolyte may be charged to the compartment lengthwise of the cell of which opening (28) of the cathode (19) forms a part and thence via a channel (43) in the wall of the gasket (22) to the anode compartment of the cell, and to which products of electrolysis may be passed from the anode compartments of the cell via channel (44) in the wall of the gasket (22) and via the compartment lengthwise of the cell of which the opening (31) in the cathode (19) forms a part. Similarly, the cell also comprises vessels from which liquid, e.g. water, may be charged to the compartment lengthwise of the cell of which opening (30) in the cathode (19) forms a part and thence via a channel (not shown) in the wall of the gasket (26) to the cathode compartment of the cell, and to which products of electrolysis may be passed from the cathode compartments of the cell via channel (47) in the wall of the gasket (26) and via the compartment lengthwise of the cell of which the opening (29) in the cathode (19) forms a part.

Figure 4:
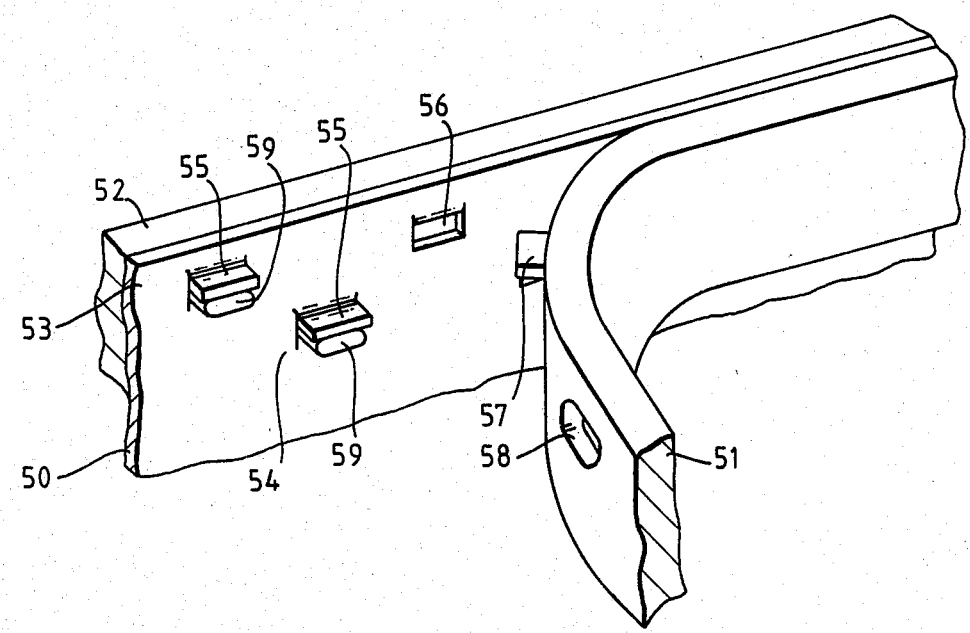
FIGS. 4, 5 and 6 show isometric views of parts of a metal electrode and an associated pair of gaskets, in which projections and recesses are shown, the parts illustrated being those parts within the dotted lines of FIG. 3.
Figure 7:
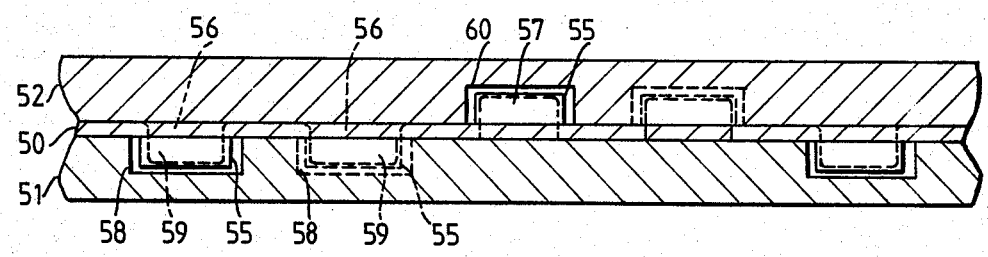
FIGS. 7, 8 and 9 show cross-sectional views in plan of an assembled form of the parts of a metal electrode and an associated pair of gaskets shown respectively in FIGS. 4, 5 and 6.

Referring to FIGS. 4 and 7 there is shown a part (50) of the anode (23) and parts (51,52) of the adjacent gaskets (22,24).

The anode comprises two rows (53,54) of projections (55) and holes (56) made by forming three slits in the anode and folding back a lip to a position approximately perpendicular to the surface of the anode, which lip serves as a projection (55), and a hole (56). The projections in each of the rows (53,54) are positioned alternately on one side and the other of the anode (23) and the projections (55) and holes (56) in row (53) are staggered in position with respect to the projections (55) and holes (56) in the adjacent row (54). The part (51) of gasket (22) positioned on one side of the anode (23) comprises moulded projections (57) and recesses (58) arranged in two rows corresponding to the rows (53,54) of projections (55) and holes (56) on the anode (23). Similarly, the part (52) of gasket (24) positioned on the other side of the anode (23) comprises moulded projections (59) and recesses (60) arranged in two rows corresponding to the rows (53,54) of the projections and holes on the anode (23).

Figure 5:
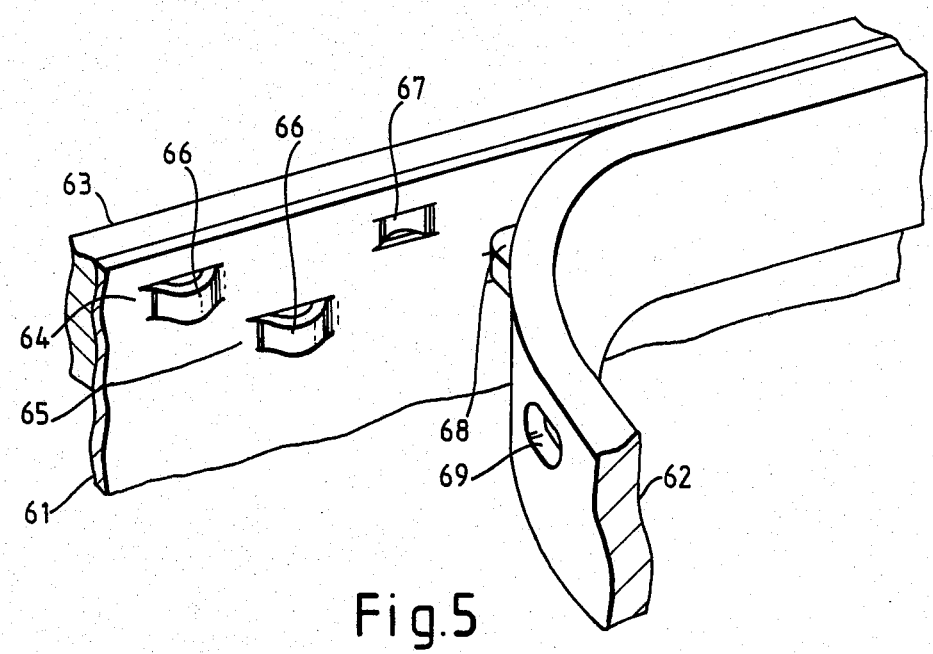
Figure 8:
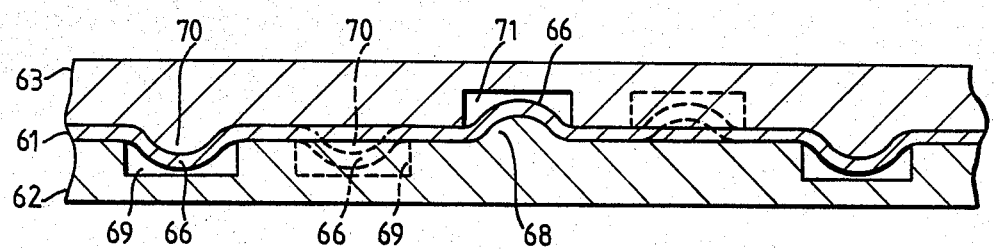

Referring to FIGS. 5 and 8 there is shown a part (61) of the anode (23) and parts (62,63) of the adjacent gaskets (22,24). The anode comprises two rows (64,65) of projections (66) and recesses (67) each projection and recess being formed by making a pair of parallel slits on the anode and displacing the part defined by the slits to form a projection (66) and to leave a recess (67). The projections (66) in each of the rows (64,65) are positioned alternately on one side and the other of the anode (23) and the projections (66) and recesses (67) in one row (64) are staggered in position with respect to the projections (66) and recesses (67) in the adjacent row (65). The part (62) of gasket (22) positioned on one side of the anode (23) comprises moulded projections (68) and recesses (69) arranged in two rows corresponding to the rows (64,65) of projections (66) and recesses (67) on the anode (23). Similarly, the part (63) of gasket (24) positioned on the other side of the anode (23) comprises moulded projections (70) and recesses (71) arranged in two rows corresponding to the rows (64,65) of the projections (66) and recesses (67) on the anode (23).

Figure 6:
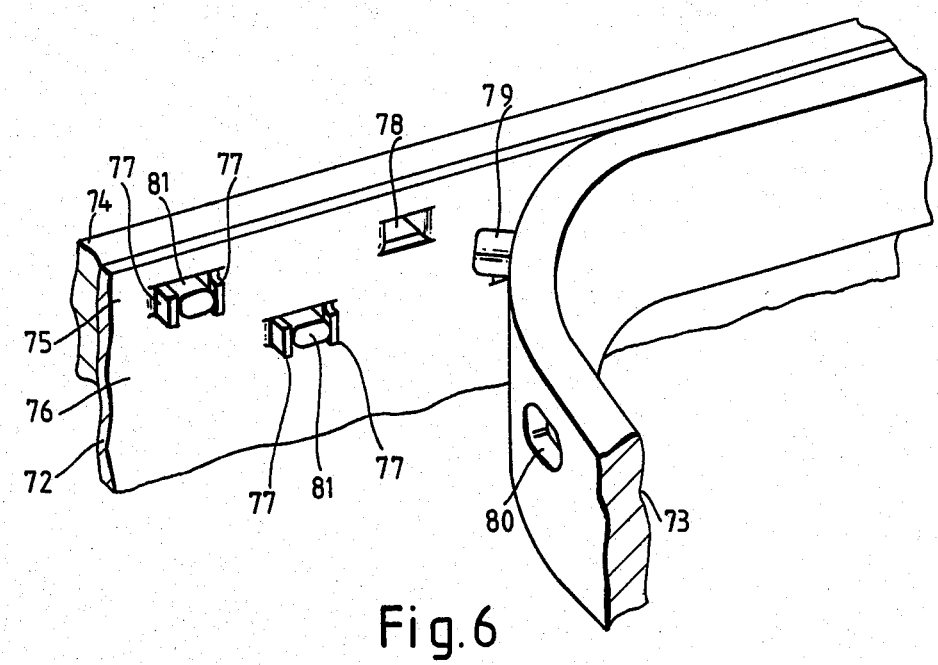
Figure 9:
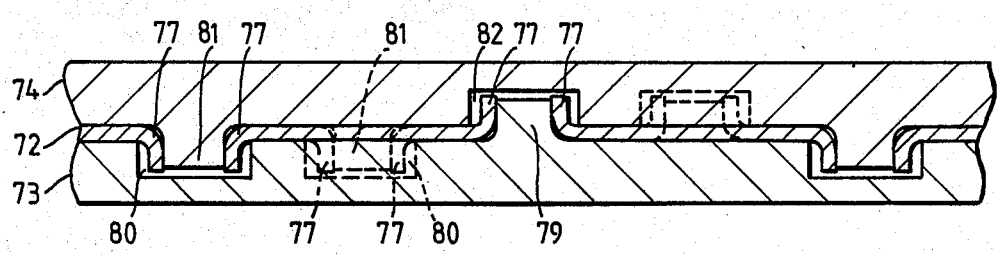

Referring to FIGS. 6 and 9 there is shown a part (72) of the anode (23) and parts (73,74) of the adjacent gaskets (22,24). The anode comprises two rows (75,76) of projections (77) and holes (78) each projection and hole being formed by making slits on the anode and displacing the parts defined by the slits to form a pair of upstanding lips which form pairs of projections (77) and a hole (78). The projections (77) in each of the rows (75,76) are positioned alternately on one side and the other of the anode (23) and the projections (77) and holes (78) in one row (75) are staggered in position with respect to the projections (77) and holes (78) in the adjacent row (76). The part (73) of gasket (22) positioned on one side of the anode (23) comprises moulded projections (79) and recesses (80) arrange in two rows corresponding to the rows (75,76) of projections (77) and recesses (78) on the anode (23). Similarly, the part (74) of gasket (24) positioned on the other side of the anode (23) comprises moulded projections (81) and recesses (82) arranged in two rows corresponding to the rows (75,76) of the projections and holes on the anode (23).

Referring to FIGS. 4 and 7 the projections (55) and holes (56), on and in one surface of the part (50) of the anode (23) are positioned alternately in both of the rows (53,54) of projections and recesses. In alternative embodiments one row (53) may consist of holes (56) and no projections and the adjacent row (54) may consist of projections (55) each of which is associated with a hole (56). In this latter embodiment projections (55) in one row (54) may be positioned substantially in line with the holes (56) in the adjacent row (53), or the projections (55) in one row (54) may be staggered in position with respect of the holes (56) in the adjacent row (53), that is positioned on a line between adjacent holes (56) in row (53). In the embodiment illustrated in FIGS. 4 and 7 the projections (55) and holes (56) in row (53) may be positioned in line with the projections (55) and holes (56) in row (54).

We claim:

1. A gasket of an electrically insulating material suitable for use in an electrolytic cell, which gasket comprises a frame-like part which defines a central opening and a plurality of projections and/or recesses on and/or in a surface thereof which are adapted to cooperate with corresponding recesses and/or projections in and/or on a surface of an anode or of a cathode or of a gasket adjacent thereto, and in which the projections and/or recesses are present as a plurality of rows thereof on and/or in a surface of the gasket.

2. A gasket as claimed in claim 1 which is substantially planar.

3. A gasket as claimed in claim 1 in which the projections and/or recesses are positioned on and/or in a frame-like part of the gasket.

4. A gasket as claimed in claim 1 which comprises projections and/or recesses on and/or in opposite surfaces of the gasket.

5. A gasket as claimed in claim 1 which comprises two rows of projections and/or recesses.

6. A gasket as claimed in claim 1 in which the projections and/or recesses in one row are staggered in relation to the projections and/or recesses in a row or rows of projections and/or recesses adjacent thereto.

7. A gasket as claimed in claim 1 in which each row comprises both projections and recesses.

8. A gasket as claimed in claim 1 in which the projections comprise studs on the surface of the gasket.

9. A gasket as claimed in claim 1 in which the projections and/or recesses in a row thereof are spaced apart by a distance in the range 4 to 20 cm.

10. A gasket as claimed in claim 1 in which a row of projections and/or recesses is spaced apart from an adjacent row thereof by a distance in the range 0.5 to 2 cm.

11. A gasket as claimed in claim 1 which is made of resilient material.

12. An electrolytic cell which contains a gasket as claimed in claim 1.

13. An electrolytic cell as claimed in claim 12 which is of the filter press type and which comprises a plurality of alternating anodes and cathodes and a plurality of gaskets.

14. An electrolytic cell as claimed in claim 12 or claim 13 in which a gasket is positioned adjacent to an anode and/or cathode and the projections and/or recesses on and/or in a surface of the gasket cooperate with corresponding recesses and/or projections in and/or on a surface of the anode and/or cathode adjacent thereto.

15. An electrolytic cell as claimed in claim 14 in which the projections and recesses on and in a surface of an anode or cathode are produced by forming a slit or slits in a surface of the anode or cathode and displacing a part of the anode or cathode into the form of an upstanding projection.

* * * * *